(12) United States Patent
Lee (10) Patent No.: US 10,824,712 B2
(45) Date of Patent: Nov. 3, 2020

(54) METHOD OF AUTHENTICATING DEVICE USING PHOTOGRAPHED IMAGE AND SYSTEM THEREFOR

(71) Applicant: SK PLANET CO., LTD., Seongnam-si (KR)

(72) Inventor: Gi Dong Lee, Seoul (KR)

(73) Assignee: SK PLANET CO., LTD., Seongnam-Si (KR)

( * ) Notice: Subject to any disclaimer, the term of this patent is extended or adjusted under 35 U.S.C. 154(b) by 151 days.

(21) Appl. No.: 16/118,682

(22) Filed: Aug. 31, 2018

(65) Prior Publication Data

US 2019/0311111 A1    Oct. 10, 2019

(30) Foreign Application Priority Data

Apr. 5, 2018 (KR) .................. 10-2018-0039549

(51) Int. Cl.
*H04L 29/06* (2006.01)
*G06F 21/44* (2013.01)
*G06K 9/32* (2006.01)
*G06T 7/11* (2017.01)

(52) U.S. Cl.
CPC ......... *G06F 21/445* (2013.01); *G06K 9/3241* (2013.01); *G06T 7/11* (2017.01); *H04L 63/08* (2013.01)

(58) Field of Classification Search
CPC ........ G06F 21/445; G06F 21/44; G06F 21/45; H04L 63/08; H04L 63/12; H04L 63/0869; H04L 63/123; H04L 63/126; G06T 7/11
See application file for complete search history.

(56) References Cited

U.S. PATENT DOCUMENTS

| | | | | |
|---|---|---|---|---|
| 6,351,550 B1 * | 2/2002 | Inaoka | ................. | G06K 9/6203 382/135 |
| 7,818,571 B2 * | 10/2010 | Kennedy | ................. | G06F 21/35 713/168 |
| 8,229,210 B2 * | 7/2012 | Rao | ...................... | H04N 1/6052 382/162 |
| 8,949,934 B2 * | 2/2015 | Wang | .................... | H04L 9/3215 713/168 |
| 9,697,348 B1 * | 7/2017 | Maresh | .................... | G06F 21/36 |
| 9,940,515 B2 * | 4/2018 | Callegari | ........... | G06K 9/00577 |
| 2015/0121512 A1 * | 4/2015 | Lau | ........................ | H04W 12/06 726/19 |

FOREIGN PATENT DOCUMENTS

| KR | 10-2005-0005578 A | 1/2005 |
|---|---|---|
| KR | 10-1205738 B1 | 11/2012 |
| KR | 10-2016-0098901 A | 8/2016 |
| KR | 10-1793257 B1 | 11/2017 |

* cited by examiner

*Primary Examiner* — Hosuk Song
(74) *Attorney, Agent, or Firm* — Fenwick & West LLP (57) ABSTRACT

Disclosed herein are an authentication method between two devices, an authentication system, and an authentication device capable of performing the authentication method. More particularly, the present invention relates to an authentication method, authentication system and authentication device, wherein a specific device for authentication photographs a photo or image of a device to be connected (hereinafter referred to as a "target device") and is connected to the target device through the medium of the photographed image of the device.

14 Claims, 6 Drawing Sheets

METHOD OF AUTHENTICATING DEVICE USING PHOTOGRAPHED IMAGE AND SYSTEM THEREFOR

CROSS REFERENCE TO RELATED APPLICATION

The present application claims the benefit of Korean Patent Application No. 10-2018-0039549 filed in the Korean Intellectual Property Office on Apr. 5, 2018, the entire contents of which are incorporated herein by reference.

BACKGROUND OF THE INVENTION

1. Technical Field

The present invention relates to an authentication method between two devices, an authentication system, and an authentication device and, more particularly, to an authentication method, authentication system and authentication device, wherein a specific device for authentication photographs a photo or image of a device to be connected (hereinafter referred to as a "target device") and is connected to the target device through the medium of the photographed image of the device.

2. Description of the Related Art

In general, in order to release the locking of a smart device such as a smartphone or a tablet PC, a method of entering a password, a method of inputting a pattern, a method of recognizing the iris or a method of recognizing a fingerprint is used.

An action of releasing the locking of a smart device is taken by a user several times a day. In this case, in order to improve user convenience, a method of simplifying the locking release method continues to be developed. A method of recognizing a living body, such as the aforementioned iris recognition or fingerprint recognition, has also been developed as part of such necessity, and has been evaluated as higher user convenience than the existing password or a pattern input method.

However, a conventional authentication method, for example, the method of entering a password or pattern has a great danger that a password or pattern may be exposed. Furthermore, the method has a problem in that a user feels inconvenient in entering a PIN or pattern each time. Furthermore, the bio-authentication method has a problem in that it cannot be used in a smart device not equipped with a module for implementing a corresponding function because the method can be used only in a smart device equipped with such a module.

The present invention relates to a method of authenticating a device or a method of releasing the locking of a device, and proposes a method of photographing a target device whose locking will be released using a device capable of photographing, such as smart glasses, and executing the authentication of the target device or releasing the locking of the target device.

The present invention has been made keeping in mind the above problems occurring in the prior art and has been invented to solve the aforementioned technical problems and to provide additional technical elements that may not be easily invented by those skilled in the art to which the present invention pertains.

PRIOR ART DOCUMENT

Patent Document

Korean Patent No. 10-1793257 (Nov. 2, 2017)

SUMMARY OF THE INVENTION

An object of the present invention is to provide an authentication method capable of simply implementing user authentication, that is, locking release performed by a user several times a day, and also maintaining security.

Another object of the present invention is to provide an authentication method capable of substituting an authentication method using a password or a pattern that may be easily exposed and to implement an authentication method having enhanced safety and convenience even in a device not having a bio-recognition function.

Technical objects to be achieved by the present invention are not limited to the aforementioned objects, and those skilled in the art to which the present invention pertains may evidently understand other technological objects from the following description.

A method of authenticating a device according to an embodiment of the present invention includes photographing, by an authentication device, at least some region of a target device, comparing, by the authentication device, a photographed image with a previously stored reference image, transmitting, by the authentication device, a verification request to the target device if, as a result of the comparison, similarity between the photographed image and the reference image is greater than a threshold, recognizing, by the authentication device, a verification response from the target device, and transmitting, by the authentication device, a result of the verification to the target device.

Furthermore, the method of authenticating a device may further include previously registering, by the authentication device, the target device before photographing the at least some region of the target device. Furthermore, in this case, previously registering the target device may include connecting the authentication device and the target device over a short distance network, photographing, by the authentication device, the at least some region of the target device, and storing, by the authentication device, the photographed region of the target device as the reference image.

The method of authenticating a device may further include receiving, by the authentication device, location information from the target device before transmitting the verification request to the target device and comparing, by the authentication device, current location of the authentication device with the location information of the target device. Transmitting the verification request to the target device may be implemented to be performed when a distance value between the location of the authentication device and the location of the target device is smaller than a threshold.

Furthermore, in the method of authenticating a device, comparing the photographed image with the previously stored reference image may include extracting a plurality of feature points from the photographed image and comparing the plurality of extracted feature points with the reference image.

Furthermore, in the method of authenticating a device, recognizing the verification response of the target device may include recognizing, by the authentication device, an output screen of the target device. Transmitting the result of the verification to the target device may include transmitting, by the authentication device, a value calculated based on the output screen to the target device.

In this case, the output screen of the target device may include a plurality of randomly combined colors.

Furthermore, in the method of authenticating a device, recognizing the output screen of the target device may include recognizing, by the authentication device, at least some region of the recognized output screen and calculating RGB values based on colors within the recognized region. Transmitting the value calculated based on the output screen to the target device may include transmitting, by the authentication device, the calculated RGB values to the target device.

An authentication system according to another embodiment of the present invention may include an authentication device configured to generate a photographed image by photographing at least some region of a target device, compare the photographed image with a previously stored reference image, and perform a verification step on the target device if, as a result of the comparison, similarity between the photographed image and the reference image is greater than a threshold and a target device configured to perform the verification step along with the authentication device and release locking based on a result of the verification.

Furthermore, in the authentication system, the verification step may be implemented to be performed through a medium of an output screen from the target device in response to a verification request of the authentication device. In this case, the output screen may include a plurality of randomly combined colors.

Furthermore, in the authentication system, the authentication device may be implemented to recognize at least some region of the output screen, to calculate RGB values based on colors within the recognized region, and to transmit the calculated RGB values to the target device. The target device may be implemented to permit a connection with the authentication device if the RGB values received from the authentication device correspond to a plurality of colors included in the output screen by the target device.

Furthermore, in the authentication system, the authentication device may be implemented to receive location information from the target device and to perform the verification step if a distance value between the location of the target device and a location of the authentication device is smaller than a threshold.

An authentication device according to another embodiment of the present invention may include a photographing unit configured to photograph at least some region of a target device; an image comparator configured to compare a photographed image obtained by the photographing unit with a previously stored reference image; and a verification unit configured to perform verification on the target device.

A computer-readable recording medium according to another embodiment of the present invention is a computer-readable recording medium in which instructions for executing a method for an authentication device to authenticate a target device have been stored. The method may include photographing, by the authentication device, at least some region of the target device, comparing, by the authentication device, a photographed image with a previously stored reference image, verifying, by the authentication device, the target device if, as a result of the comparison, similarity between the photographed image and the reference image is greater than a threshold, and determining, by the authentication device, whether to connect the target device based on a result of the verification.

DESCRIPTION OF REFERENCE NUMERALS

100: authentication device 300: target device
110: photographing unit 120: image comparator
130: verification unit 140: control unit
150: storage unit

DETAILED DESCRIPTION

The details of the objects and technological configurations of the present invention and acting effects thereof will be more clearly understood from the following detailed description based on the accompanying drawings. Hereinafter, embodiments of the present invention are described in detail with reference to the accompanying drawings.

Embodiments disclosed in this specification should not be interpreted as limiting or used to limit the range of right of the present invention. It is evident to those skilled in the art that a description including the embodiments of this specification has various applications. Accordingly, unless otherwise defined by the claims, some embodiments described are illustrative for better understanding, and the range of right of the present invention is not intended to be restricted by the embodiments.

In this specification, a terminal refers to all of types of devices capable of data communication with an external device, such as a mobile station, a mobile terminal, a subscriber station, a portable subscriber station, a user equipment, an access terminal, a personal computer, and a phone, and may include all of or only some of functions of a corresponding device.

Function blocks illustrated in the drawings and described hereunder are only examples of possible implementations. In other implementations, different functional blocks may be used without departing from the spirit and scope of the detailed description. Furthermore, one or more functional blocks of the present invention are illustrated as separate blocks, but one or more of the functional blocks of the present invention may be a combination of various hardware and software elements for executing the same function.

Furthermore, it should be understood that an expression that some elements are "included" is an expression of an "open type" and the expression simply denotes that the corresponding elements are present, but does not exclude additional elements.

Furthermore, when it is said that one element is "connected (or coupled)" to the other element, it should be understood that one element may be directly connected or coupled" to the other element, but a third element may exist between the two elements.

Figure 1:
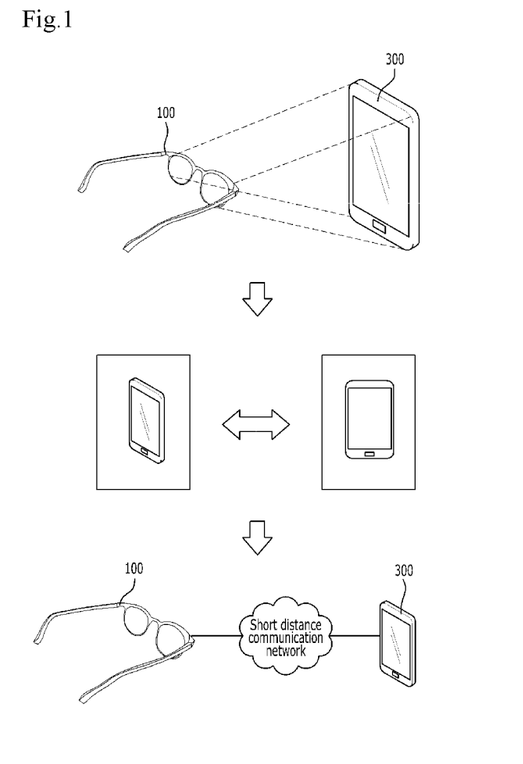
FIG. 1 schematically shows a representative embodiment in order to help understanding of an authentication method and system according to embodiments of the present invention.

First, FIG. 1 schematically shows a representative embodiment in order to help understanding of an authentication method and system according to embodiments of the present invention. Referring to FIG. 1, the authentication system to be implemented in the present invention includes an authentication device 100 and a target device 300. Furthermore, an authentication process according to an embodiment of the present invention may be basically divided into a step for the authentication device 100 to photograph the target device 300, a step of comparing a photographed image of the target device 300 with a previously stored reference image, and a step of performing a verification process over a short distance communication network. After the steps are performed, the locking of the target device 300 is released, that is, authentication for the target device 300 is terminated, so a user can use the target device 300.

The target device 300 described in the present invention refers to a target device on which a user attempts to perform authentication in order to use the target device, that is, a target device whose locking is to be released. The type of target device 300 may include devices directly carried by a user, such as a smartphone, a tablet PC, a smart watch and a PDA, and may also include home appliances incapable of being directly carried by a user, such as TV, an audio, a refrigerator, an air-conditioner and an air cleaner. It is a prerequisite that the target device 300 basically includes elements capable of processing data, for example, elements capable of processing and storing instructions for control, such as a CPU and memory, and may further include a display unit necessary for a verification process to be described later.

Furthermore, the authentication device 100 described in the present invention refers to a device for performing authentication on the target device 300, more specifically, photographing an appearance of the target device 30 and performing an additional verification process. The type of authentication device 100 includes a device being carried by a user, such as smart glasses, a smartphone, a tablet PC or a PDA, and having a function of photographing a specific target. For example, the authentication device 100 may be a wearable device always worn by a user. It is a prerequisite that like the target device 300, the authentication device 100 basically includes elements capable of processing and storing instructions, such as a CPU and memory.

Referring back to FIG. 1, FIG. 1 shows an authentication process if the authentication device 100 is smart glasses and the target device 300 is a smartphone. A detailed authentication method is described more specifically later with reference to FIGS. 3 to 7. How a user uses the present invention is schematically described with reference to FIG. 1.

A method of authenticating a device to be implemented by the present invention has an object of performing the authentication of the target device 300 based on a result of photographing when a user photographs the target device 300 using the authentication device 100 and releasing the locking of the target device 300. That is, the locking of the target device 300 can be released when a user who wears smart glasses looks at a smartphone.

This process is subdivided and described. First, a user who wears smart glasses (i.e., authentication device 100) looks as a smartphone (i.e., target device 300). This process corresponds to a step for the smart glasses to photograph an appearance of the smartphone. When the appearance of the smartphone is photographed, the smart glasses compare the photographed image with a reference image. In this case, the reference image refers to an image stored in the smart glasses, that is, a previously photographed image of the appearance of the smartphone. If, as a result of the comparison between the photographed image and the reference image, similarity between the two images is determined to be a specific threshold or more, the authentication device 100 attempts a connection with the target device 300 over a short distance communication network (e.g., Bluetooth) or performs a verification process if the two devices have already been connected. The verification process is a process for the target device 300 to additionally confirm whether the smartphone is a true connection target. The verification process is an additional verification process because whether the target device 300 is a true connection target cannot be accurately determined based on only the image comparison step. The verification process may be performed in various ways. In the present embodiment, however, a verification process between the authentication device 100 and the target device 300 is performed when the authentication device 100 reads an output screen of the target device 300, generates information matched with the output screen, and provides the generated information to the target device 300. When the verification process is completed, the target device 300 determines that the authentication has been completed and releases the locking state of the target device.

FIG. 1 illustrates a case where the authentication device 100 is smart glasses and the target device 300 is a smartphone. However, the authentication method may be used in a case where the target device 300 is not a portable device in addition to portable devices. For example, if the target device 300 is an air-conditioner positioned in a house and the air-conditioner is equipped with a control pad including a display unit, a user can photograph an appearance of the air-conditioner using the camera function of a smartphone, and can identify the target device 300 to be authenticated by comparing a photographed image with a reference image using the above method. Furthermore, after the target device is identified through the comparison between the images, the operation locking state of the air-conditioner may be released through a verification process.

As described above, an embodiment of the present invention provides a method for the authentication device 100 to perform authentication on the target device 300 by photographing an appearance of the target device 300, identifying the target device 300 based on the photographed image, and performing verification between the authentication device 100 and the target device 300.

Figure 2:
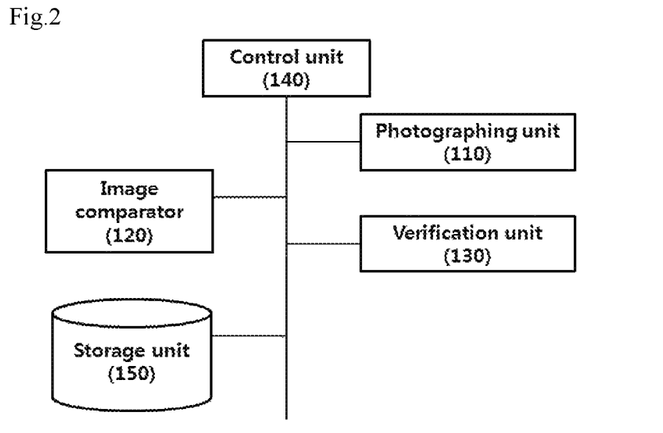
FIG. 2 shows a block diagram of a detailed configuration of an authentication device capable of performing an authentication method.

Detailed elements of the authentication device 100 are described below with reference to FIG. 2. Referring to FIG. 2, the authentication device 100 for performing the authentication method includes a photographing unit 110, an image comparator 120, a verification unit 130, and a control unit 140.

The photographing unit 110 photographs at least some region of the target device 300.

At least some region of the target device 300 refers to at least some region of an appearance of the target device 300. For example, the at least some region may be construed as being some of or the entire touch screen region, some of or the entire back of the target device 300, some region of the edge or front of the target device 300, and a region where a camera is positioned in front of the target device 300. At least some region of the target device 300 does not mean only a face of a device that is externally seen, but may be construed as including all of regions capable of identifying a corresponding target device 300, such as the entire back or some region when a back cover is detached and a region in which the serial number of a device is written.

The photographing unit 110 may be differently implemented depending on the type of authentication device 100, but may be implemented using a camera including a lens and image processing means.

The image comparator 120 compares a photographed image obtained by the photographing unit 110 with a previously stored reference image. The reference image refers to an image of the target device 300 that has been captured when a user previously registers the target device 300 with the authentication device 100. The reference image may be stored in a storage unit 150 (e.g., memory) included in the authentication device 100 or an external server that may be connected to the authentication device 100 over a network.

The reference image may be a plural number. For example, photographed images of the front, side and rear of the target device 300 may be stored as reference images, and images of the target device 300 photographed at different angles may also be stored as reference images. If a plurality of reference images has been stored, there is an effect in that precision of a comparison between images can be improved because similarity can be determined based on more information when a reference image is compared with a photographed image.

If a reference image has been stored in the memory of the authentication device 100, the image comparator 120 may directly compare a photographed image, obtained by the photographing unit 110, with the reference image. If the reference image has been stored in an external server, the image comparator 120 may load the reference image through a separate access process with the external server and compare the photographed image with the reference image.

The image comparator 120 may determine similarity between a photographed image and a reference image through a comparison, and may calculate the similarity as a single value. If the similarity does not reach a preset threshold, the authentication device 100 may stop an on-going authentication process. If the similarity is the threshold or more, a subsequent verification process may be performed. The similarity refers to a value indicating that how much are a photographed image and a reference image similar when they are compared. A method of calculating similarity between images may include various methods, such as a method of recognizing the form of a target within an image and determining how much are forms similar or extracting feature points from images and determining how much are the images similar through a comparison between the locations of the feature points or RGB values at the feature points.

If a similarity value of the image comparator 120 is a threshold or more, the verification unit 130 determines whether the recognized target device 300 is a device that is the subject of authentication, that is, a device whose locking must be released. The verification unit 130 may perform verification on the target device 300 using (i) a method of transmitting a verification request including specific information to the target device 300, (ii) a method of performing verification through mutual data transmission and reception between the authentication device 100 and the target device 300, or (iii) a method of recognizing a given output screen and/or code output by the target device 300 and transmitting a corresponding result value to the target device 300. Each of the verification methods is described below.

The verification method (i): this corresponds to an embodiment in which the verification unit 130 performs a verification process by transmitting a verification request to the target device 300. The verification unit 130 transmits a verification request (in this case, the verification request means data of a transmittable form) including specific information to the target device 300. In this case, the verification request includes information (e.g., device-specific identification number) about the authentication device 100 or information (e.g., a unique identification letter by which a user can be identified, such as a user's ID and/or password) about a user, so the target device 300 may determine whether authentication has been normally performed based on the information included in the verification request and release locking based on a result of the determination. That is, when the verification unit 130 according to the present embodiment transmits the verification request including the specific information, the target device 300 previously determines whether the contents of the specific information correspond to contents complying with a requirement for locking release and releases locking.

The verification method (ii): this corresponds to another embodiment in which the verification unit 130 performs a verification process through data transmission and reception to and from the target device 300. The verification unit 130 may transmit a verification request to the target device 300. In response thereto, the target device 300 transmits a verification response (in this case, the verification response means data of a transmittable form). The verification unit 130 may verify whether the received verification response has been received from a device to be authenticated and transmit a verification completion response to the target device 300. In this case, the verification response transmitted from the target device 300 to the verification unit 130 may include pieces of information by which the target device 300 can be identified. The verification unit 130 determines whether the pieces of information correspond to a device to be now authenticated by a user, that is, to be locked, and finally transmits the verification completion response.

The verification method (iii): this corresponds to yet another embodiment. After the verification unit 130 recognizes an output screen or code randomly generated by the target device 300, it may generate the value of the output screen or code and perform a verification process by providing the value to the target device 300. For example, if there is a verification request received from the verification unit 130, the target device 300 may generate a given output screen or code and output it through a display unit. The verification unit 130 may recognize the output screen or code using the photographing unit 110 of the authentication device 100, may calculate a value corresponding to the corresponding output screen or code, and may provide the calculated value to the target device 300. After receiving the calculated value, the target device 300 may confirm whether the received value corresponds to the screen or code output by the target device 300, and may perform authentication completion or unlocking.

A process for the verification unit 130 of the authentication device 100 and the target device 300 to perform mutual verification is described more specifically with reference to drawings to be described later.

The control unit 140 configured to control all the photographing unit 110, the image comparator 120 and the verification unit 130 is further included as another element of the authentication device 100. The control unit 140 may also be called a controller, a microcontroller, a microprocessor or a microcomputer. The control unit 140 may be implemented using hardware, firmware or software, or a combination of them. Hardware may be configured to include an application specific integrated circuit (ASIC), a digital signal processor (DSP), a digital signal processing device (DSPD), a programmable logic device (PLD) or a field programmable gate array (FPGA) if the control unit is implemented using the hardware. Firmware or software may be configured to include a module, procedure or function for performing the above functions or operations if the control unit is implemented using the firmware or software.

Furthermore, the storage unit 150 of the authentication device 100, that is, memory, may store program instructions and content necessary for an authentication method to be performed. The storage unit 150 may be implemented using read only memory (ROM), random access memory (RAM), erasable programmable read only memory (EPROM), electrically erasable programmable read-only memory (EEPROM), flash memory, static RAM (SRAM), hard disk drive (HDD) or solid state drive (SSD).

The elements of the authentication device 100 used to perform authentication along with the target device 300 have been described above. Although the elements necessary for authentication have been chiefly described in the detailed description, not-illustrated elements, for example, the display unit and communication unit of the authentication device 100 and other elements that must be basically included in a smart device will be naturally included in the range evidently understood by those skilled in the art.

Hereinafter, an authentication method using the devices is described according to the sequence with reference to the drawings.

Figure 3:
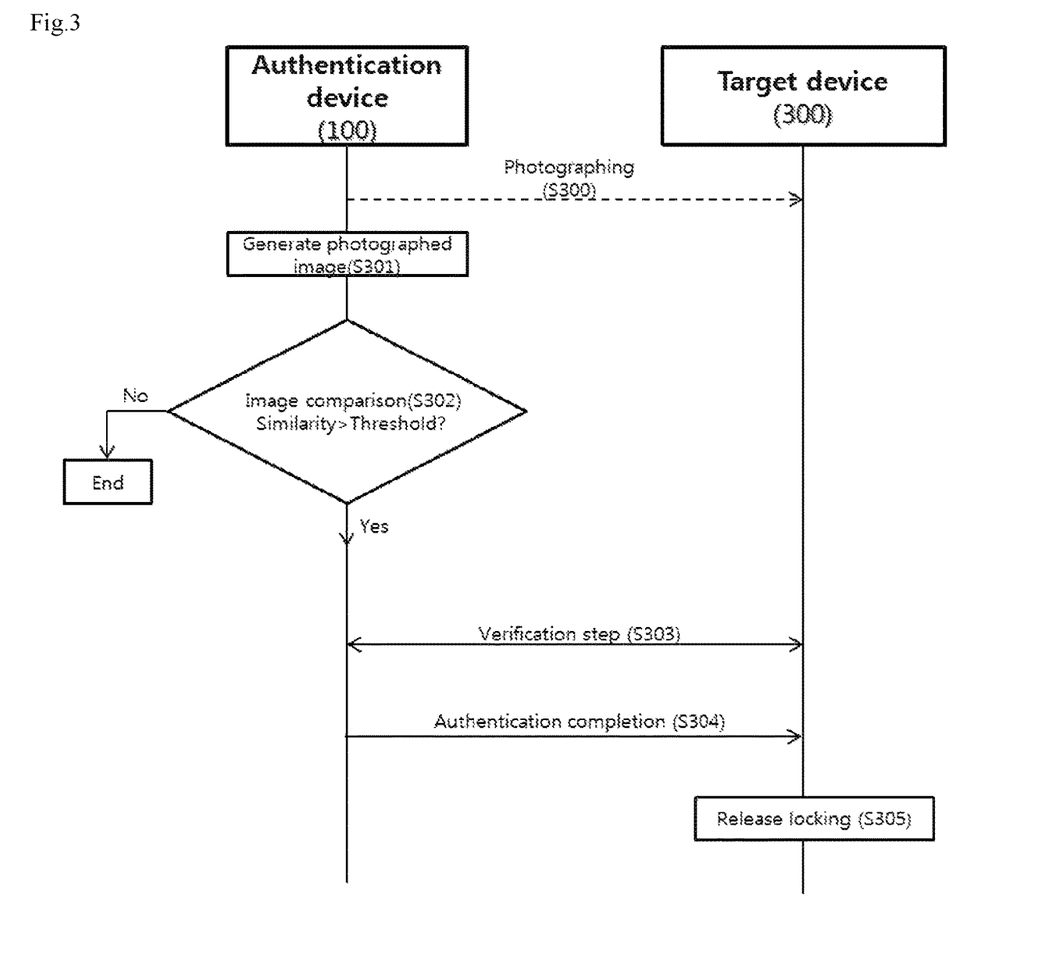
FIG. 3 shows a flowchart of a process of performing authentication between an authentication device and a target device.

FIG. 3 shows a flowchart of a process of performing authentication between an authentication device and a target device. For reference, in order to help understanding of the invention, a process for a user to wear smart glasses (i.e., authentication device 100) and to perform authentication on a smartphone (i.e., target device 300), that is, a process of unlocking the smartphone, is assumed in the following embodiments.

The authentication method starts from a process for the user to wear the smart glasses and to look at the smartphone. This process corresponds to step S300 in which the authentication device 100 photographs the target device 300. The "photographing" is a term meaning that the photographing unit 110 of the smart glasses recognizes at least some region of the outside of the target device 300. It may be understood that the camera of the smart glasses photographs the outside of the smartphone in a video or photo form. The outside of the target device 300 means a surface exposed when the smartphone is viewed in a given direction. In this case, the outside of the target device 300 may be understood to include an outside in the state in which the outside of a housing has been covered with a casing provided by a user in addition to the housing provided when the target device was first produced. That is, if a smartphone has been registered in the state in which the smartphone has been covered with a casing or not covered with a casing in a pre-registration step, authentication may be performed based on the outside state registered in the pre-registration step. Accordingly, a user may use the authentication method of the present invention although the housing of a smartphone is covered with a separate casing. Furthermore, in photographing in this step, the entire form of a smartphone, that is, the target device 300, should not be included in a single image, and only some of a region of the target device 300 may be included. For example, if a unique pattern capable of identifying a corresponding device or other identification letter is present in the housing of the target device 300, only a corresponding portion may be photographed or a portion including a unique pattern or letter of a covered casing may be photographed.

After the photographing is performed at step S300, the authentication device 100 generates and stores a photographed image (S301). The photographed image may be stored as an image file of a format that is commonly used in the corresponding field.

After step S301, the authentication device 100 calculates similarity by comparing the photographed image with a reference image, and determines whether the target device 300 is a device to be authenticated by determining whether the similarity is greater than a threshold (S302). As described above, the reference image means an image previously stored after the outside of the target device 300 is photographed in a pre-registration step. The reference image may be stored in the storage unit 150 of the authentication device 100 or an external server separate from the authentication device 100.

If, as a result of the determination at S302, it is determined that the similarity has a value not greater than the threshold, that is, if the photographed image of the target device 300 is determined to be not similar to the reference image, the authentication device 100 terminates the on-going authentication process. If, as a result of the determination at S302, it is determined that the similarity has a value greater than the threshold, the authentication device 100 performs a subsequent verification step (S303).

After step S302, the verification step is performed based on a result of the determination. In this case, the verification step may be performed according to three methods.

In the first method, when the authentication device 100 transmits a verification request including specific information, the target device 300 determines whether it has been authenticated based on the specific information. For example, when the authentication device 100 transmits a verification request including its own unique ID number or the unique ID of a user to the target device 300, the target device 300 determines whether a corresponding device or user is a previously registered device or user. If, as a result of the determination, the corresponding device or user is a previously registered device or user, the target device 300 determines that the verification request is a verification request received from a correct authentication device 100, and releases locking. If, as a result of the determination, however, the corresponding device or user is not a previously registered device or user, the target device 300 does not release locking and may display that an authentication attempt from an incorrect device or user was made on the display unit or may notify the user of another target device 300 of the authentication attempt from the incorrect device or user.

In the second method, when the authentication device 100 transmits a verification request, the target device 300 transmits a verification response to the authentication device 100 in response to the verification request. The authentication device 100 determines whether the verification response is a response from a correct target device 300 based on information included in the verification response and transmits a verification completion response to the target device 300.

The verification response transmitted from the target device 300 to the authentication device 100 may include information by which the target device 300 can be identified, for example, the serial number of the target device 300. The authentication device 100 may perform a verification completion response by determining whether the serial number included in the verification response is identical with a previously registered serial number. The target device 300 determines whether to release locking in response to the verification completion response.

Figure 4:
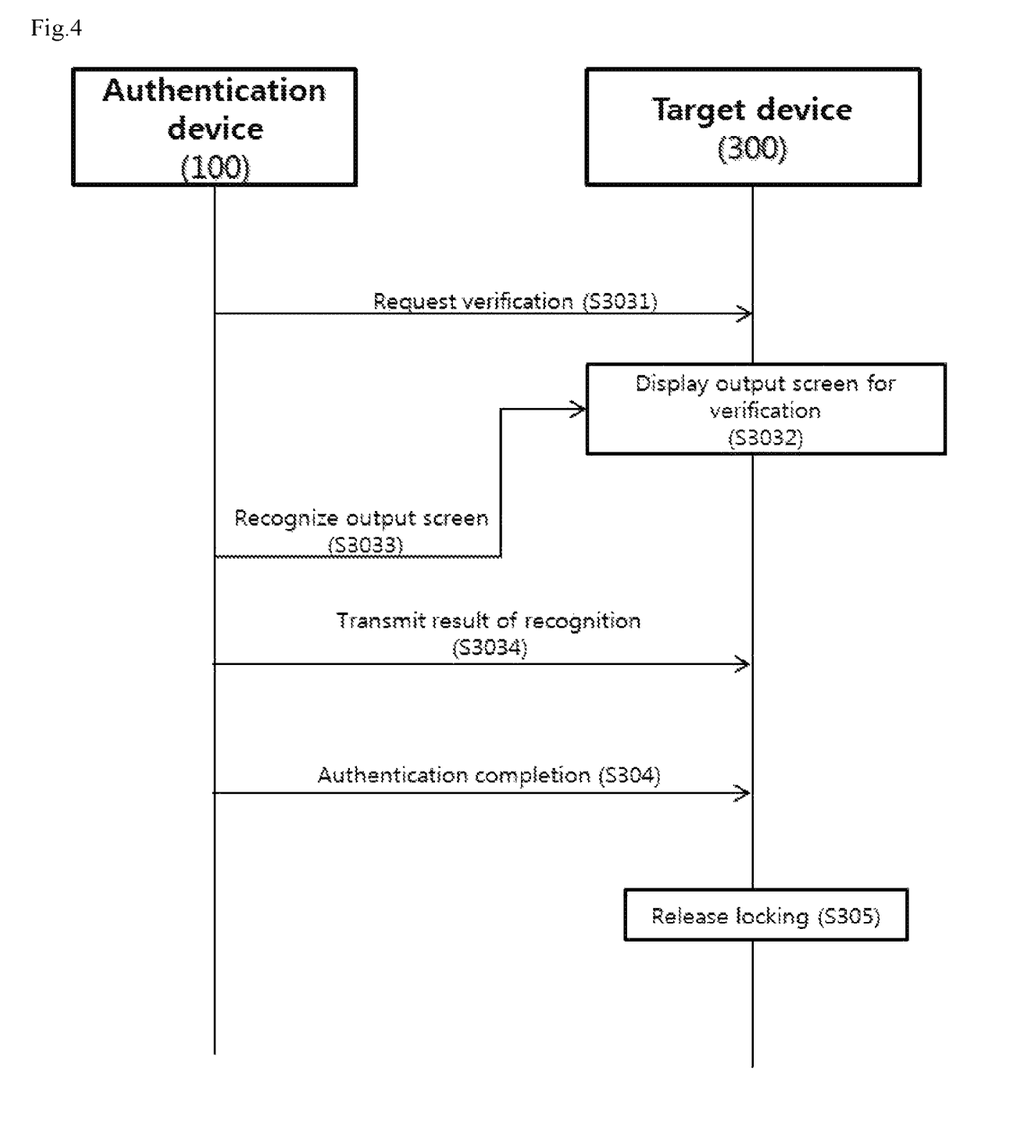
FIG. 4 shows a verification process between devices in an authentication method.

In the third method, the authentication device 100 performs a verification process by recognizing a given output screen or code generated by the target device 300 in response to a verification request, generating a value for the corresponding output screen or code, and providing the value to the target device 300. FIG. 4 shows the verification method of the third method according to the sequence.

Figure 5:
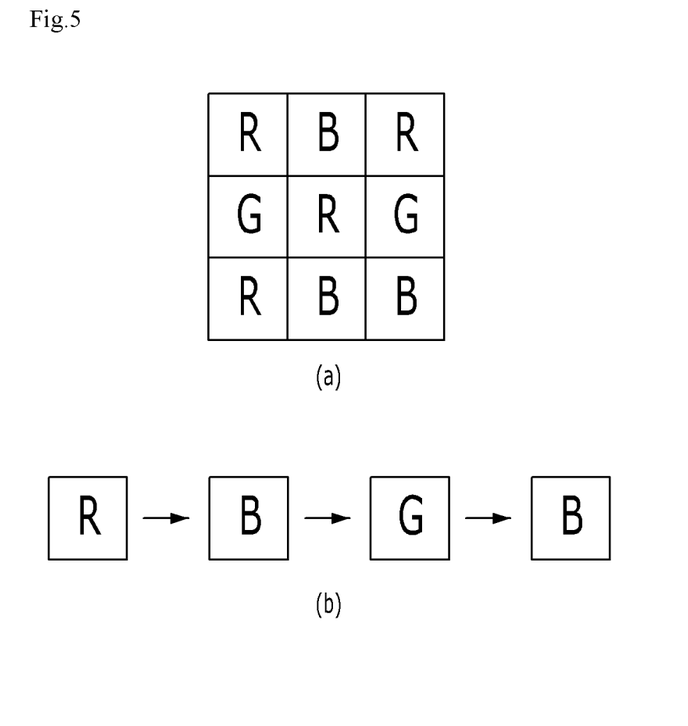
FIG. 5 shows an example of an output screen displayed on the display unit of a target device during a verification process.

Referring to FIG. 4, first, the authentication device 100 transmits a verification request to the target device 300 (S3031). The target device 300 displays an output screen or code for verification on the display unit in response to the verification request (S3032). That is, a randomly generated screen or code is displayed on the display unit of a smartphone. The screen may include given red (R), green (G) and blue (B) figures, for example. The code may include barcode, QR code or code having a combination of numerical and alphabetical information. FIG. 5 shows an example of an output screen including RGB colors. FIG. 5(*a*) is an embodiment in which a screen has been divided into a plurality of squares and the squares have been marked by red, green and blue, respectively. In order to help understanding of the embodiment, the squares have been marked by letters, such as R, G and B, but it is to be noted that the square has been marked by a color. Unlike in FIG. 5(*a*), in FIG. 5(*b*), R, G, and B are marked while colors are changed over time. For example, the target device 300 may implement an output screen that may be recognized by the authentication device 100 by exposing squares of R-B-G-B colors at an interval of 0.1 second. As described above, the target device 300 may output the color of a screen while randomly changing the color, so the authentication device 100 can recognize the screen of the target device 300 (S3033).

After photographing the output screen of the target device 300, the authentication device 100 may generate a value corresponding to the output screen and transmit the value to the target device 300 (S3034). The value generated by the authentication device 100 is related to RGB values on the screen output by the target device 300. For example, an average value of the RGB values may have been listed in accordance with the output screen of FIG. 5(*a*), and the RGB values may have been listed in the sequence of time in accordance with the output screen of FIG. 5(*b*). In step S3034, after the authentication device 100 fully recognizes the screen output by the target device 300, it may calculate a specific value and transmit the specific value to the target device 300. Alternatively, the authentication device 100 may be implemented to calculate a specific value while recognizing the output screen of the target device 300 and to share the specific value with the target device 300 in real time.

After step S3034, the target device 300 receives the specific value calculated by the authentication device 100, determines whether the specific value is identical with the screen or code output by the target device 300, and performs authentication completion and unlocking (S304 and S305). A process of determining whether the specific value is identical with the output screen or code may include, for example, a process for the target device 300 to determine whether the RGB average value received from the authentication device 100 is identical with that of RGB values output by the target device 300 through a comparison or a process of determining whether the received RGB values are included in the RGB values output by the target device 300 within a preset error range.

A representative embodiment of the authentication method using the authentication device 100 and the target device 300 has been described according to the sequence.

Hereinafter, a pre-registration process between the authentication device 100 and the target device 300 is described with reference to FIG. 6. The pre-registration process refers to a process for the authentication device 100 to previously store basic information and a reference image of the target device 300 so that it can perform an authentication method, such as that of FIG. 3.

In the first step of the pre-registration process, the authentication device 100 and the target device 300 are interconnected (S401). For example, a user may connect two devices through pairing by turning on the Bluetooth switch of smart glasses (i.e., authentication device 100) and turning on the Bluetooth switch of a smartphone (i.e., target device 300). In this case, the connection of the two devices is not limited to a Bluetooth connection, and the two devices may be connected through a different network connection method. In step S401, the two devices are connected to share basic information in addition to the transmission and reception of data. The basic information may include information related to the hardware of each device, such as the unique ID number (or serial number) of each device, a device name, a device product name, a device user name, and the data of manufacture of a device, or information about an operating system (OS) installed on each device, for example.

After step S401, the authentication device 100 photographs at least some region of the outside of the target device 300 (S402). In this case, the "photographing", as described above, means that the photographing unit 110 of the authentication device 100 recognizes at least some region of the outside of the target device 300. For example, the photographing may be understood to mean that smart glasses (i.e., authentication device 100) photograph the outside of a smartphone (i.e., target device 300) as a video or photo using its camera. Furthermore, the outside of the target device 300 may be understood to include an outside in the state in which the outside of a housing has been covered with a casing provided by a user in addition to the housing provided when the target device was first produced.

After step S402, the authentication device 100 stores the photographed image as a reference image (S403), and is disconnected from the target device 300 (S404). The reference image is an image, that is, criteria for a comparison, in order to confirm whether the target device 300 is a corresponding target device 300 when authentication is subsequently performed, more specifically, when the authentication device 100 recognizes the target device 300 through photographing.

Figure 6:
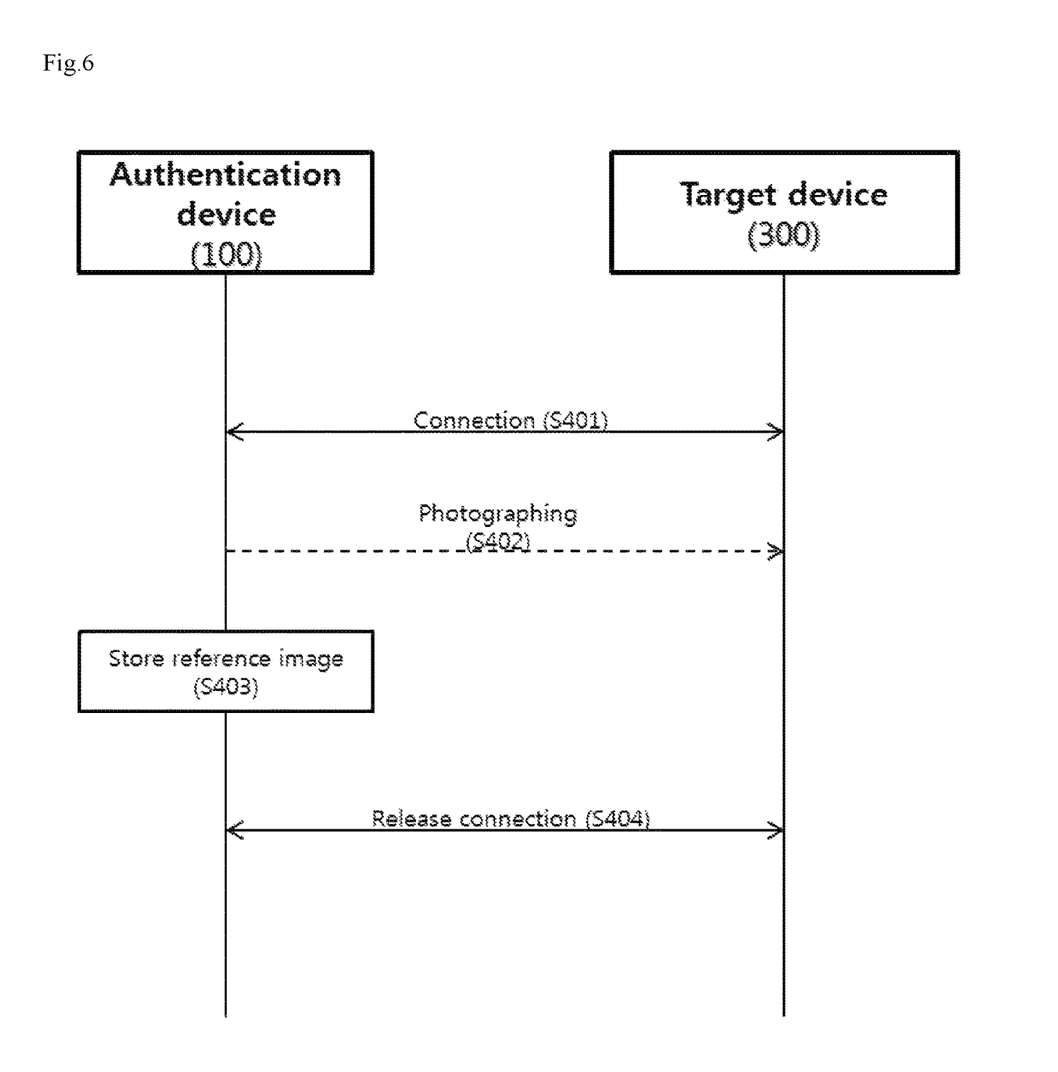
FIG. 6 shows a pre-registration process between an authentication device and a target device.

As described above, the authentication device 100 may previously register the target device 300 through the series of processes shown in FIG. 6.

Hereinafter, an authentication method according to another embodiment is described with reference to FIG. 7.

Figure 7:
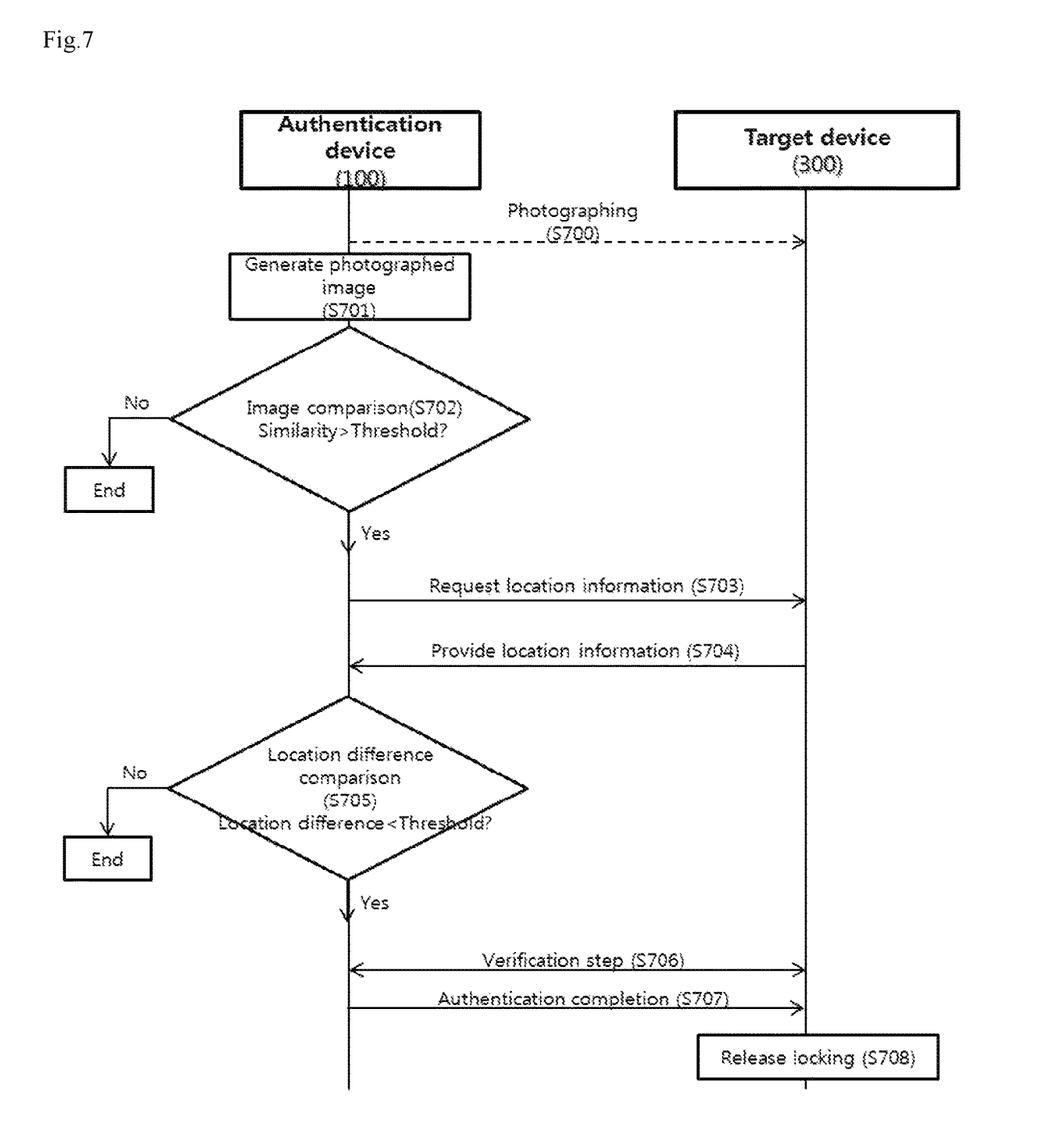
FIG. 7 shows a flowchart of another authentication method according to an embodiment of the present invention, specifically, an authentication method including location information.

FIG. 7 shows another authentication method in the sequence of time. The authentication method of FIG. 7 is different from the authentication method of FIG. 3 in that it further uses location information of the target device 300. That is, the authentication device 100 may be implemented to further request location information of the target device 300 in addition to the use of a photographed image of the target device 300 in the process of authenticating the target device 300, to compare its location information with the location information of the target device 300, and to perform a subsequent step if, as a result of the comparison, a difference between the pieces of location information is within a preset range. Such a process is described more specifically below.

First, the authentication device 100 generates a photographed image by photographing the target device 300 and determines similarity by comparing the photographed image with a previously stored reference image (S700 to S702). For reference, steps S700 to S702 correspond to steps S300 to S302 of FIG. 3.

If, as a result of the comparison in step S702, the similarity between the images is greater than a threshold, the authentication device 100 subsequently requests location information of the target device 300 (S703). The target device 300 provides current location information to the authentication device 100 in response to the request (S704). In this case, the type of location information provided from the target device 300 to the authentication device 100 is not limited. For example, the location information may include text data, such as GPS information or AP ID information or may include image data including the appearance of a surrounding building or the appearance of a surrounding installation, that is, an image of the current location photographed by the target device 300.

After step S704, the authentication device 100 determines whether the target device 300 is positioned at the same location as the authentication device 100 based on the received location information. (S705). That is, the authentication device 100 compares the location information of the target device 300 with the current location information of the authentication device 100. If, as a result of the comparison, a difference between the pieces of location information is smaller than a threshold, the authentication device 100 determines that the two devices are positioned at the same location and then performs verification and authentication steps (S706 and S707). The target device 300 performs unlocking (S708). If, as a result of the comparison, however, a difference between the pieces of location information is equal to or greater than the threshold, the two devices determine that they are positioned at different locations and terminate the process. As described above, the authentication method according to an embodiment of the present invention can further enhance security when unlocking is performed by further including the process of determining whether two devices have the same location information.

The authentication method and authentication system according to the embodiments of the present invention have been described above with reference to the drawings.

The present invention has an advantage in that it can greatly improve a user's convenience in using a smart device because authentication can be easily performed by simply exposing a target device to the photographing unit of an authentication device without performing inconvenient user authentication.

Furthermore, the present invention has an advantage in that it can enhance security compared to a conventional technology because a user's personal information is not exposed in an authentication process.

Furthermore, the present invention has an advantage in that it can implement an authentication method having convenience and security and keeping up with bio-recognition although a user uses a device not having a bio-recognition function, that is, an old type device.

Effects of the present invention are not limited to the aforementioned objects, and other effects not described above may be evidently understood by those skilled in the art to which the present invention pertains from the following description.

Those skilled in the art to which the present invention pertains will appreciate that the present invention may be implemented in other detailed forms without changing the technological spirit or essential characteristics of the present invention. Accordingly, it is to be understood that the aforementioned embodiments are only illustrative and are not restrictive. It is also to be noted that the illustrated flowchart is merely sequential order illustrated to achieve the most preferred results in implementing the present invention, and other additional steps may be provided or some of the steps may be deleted.

The technological characteristics described in this specification and an implementation for executing the technological characteristics may be implemented using a digital electronic circuit, may be implemented using computer software, firmware or hardware including the structure described in this specification and a structural equivalent thereof or may be implemented by a combination of one or more of them. Furthermore, the implementation for executing the technological characteristics described in this specification may be implemented in the form of a computer program product, that is, a module regarding computer program instructions encoded on a kind of program storage media in order to control the operation of a processing system or for execution by the processing system.

A computer-readable medium may be a machine-readable storage device, a machine-readable storage board, a memory device, a composition of materials that affect a machine-readable electromagnetic signal or a combination of one or more of them.

In this specification, the term "apparatus (or device)" covers all of apparatuses, devices and machines for processing data, for example, apparatuses including a processor, a computer and a multi-processor or a computer.

A computer program also known as a program, software, a software application, a script or code may be written in any form of a programming language including a compiled or interpreted language or a transcendental and/or procedural language, and may also be implemented in any form including an independent program or module, component, a subroutine or other units suitable for being used in a computer environment. The computer program may not necessarily correspond to a file of a file system. The program may be stored in a single file provided to a requested program, multiple files that interact with each other (e.g., a file that stores one or more modules, a lower program or part of code), or part of a file including another program or data (e.g., one or more scripts stored in markup language document). The computer program may be implemented to be located in a single site or may be distributed to a plurality of sites and executed on multiple computers or one or more computers interconnected over wired/wireless communication networks.

A computer-readable medium suitable for storing computer program instructions and data may include all types of non-volatile memory, media and memory devices including semiconductor memory devices, such as EPROM, EEPROM and a flash memory device, for example, magnetic disks, such as an internal hard disk or an external disk, magneto optical disks, CDs, and DVDs. The processor and the memory may be supplemented by a logic circuit for a special object or may be integrated into the logic circuit for a special object.

An implementation to execute the subject matter described in this specification may be implemented in an operation system including a backend component, such as a data server, a middleware component, such as an application server, a frontend component, such as a client computer having a web browser or graphic user interface capable of interacting with the implementation of the subject matter described by a user in this specification or all combinations of one or more of the backend, middleware, and frontend components. The component of the system may be accessed by any type or medium for digital data communication, such as a communication network.

The authentication method and authentication system described in this specification may be used partially or generally through means for executing computer software, program code or instructions on an apparatus related to a client device or web-based storage system or one or more processors included in the apparatus. In this case, the processor may be part of the apparatus, the client, network infrastructure, or a computing platform such as a mobile computing platform or fixed computing platform. More specifically, the processor may be a kind of computer or processing device capable of executing program instructions, code, etc. Furthermore, the processor may further include memory for storing the authentication method, instructions, code and/or program. If memory is not included in the processor, the processor may access a storage device, such as CD-ROM, a DVD, memory, a hard disk, a flash drive, RAM, ROM, or a cache in which the authentication method, instructions, code and/or program has been stored.

Furthermore, the authentication method and authentication system described in this specification may be used partially or generally through an apparatus, a client, a gateway, a hub, a router, or an apparatus to execute computer software on or network hardware. In this case, the software may be executed in various types of apparatuses, such as a file server, a print server, a domain server, an Internet server, an intranet server, a host server and a distributed server. The aforementioned apparatuses may further include memory, a processor, a computer-readable storage medium, a storage medium, a communication apparatus, a port, a client and/or an interface capable of accessing other apparatuses over wired/wireless networks. Furthermore, the authentication method, instructions or code may also be executed by an apparatus. Other apparatuses required to execute the authentication method may be implemented as part of a hierarchical structure associated with the apparatus.

Furthermore, the apparatus may provide an interface to other devices including a client, another apparatus, a printer, a database apparatus, a print apparatus, a file apparatus, communication a apparatus, and a distributed apparatus, but not limited thereto. A connection through the interface may facilitate the remote execution of a program over wired/wireless networks. Furthermore, any one of devices connected to the apparatus through the interface may further include at least one storage device capable of storing the authentication method, instructions or code. The central processor of the apparatus may provide instructions, code, etc. to be executed on different devices to the device so that the instructions, code, etc. are stored in a storage device.

The authentication method and the authentication system described in this specification may be used partially or generally through network infrastructure. In this case, the network infrastructure may include all of devices, such as a computing device, a server, a router, a hub, a firewall, a client, a personal computer, a communication device, and a routing device, and separate modules capable of executing respective functions. The network infrastructure may further include storage media, such as story flash memory, a buffer, a stack, RAM, and ROM, in addition to the aforementioned devices and module. Furthermore, the authentication method, instructions or code may also be executed by and stored in any one of the device, module, and storage medium included in the network infrastructure. Another device required to execute the authentication method may also be implemented as part of the network infrastructure.

Furthermore, the "computer-readable recording medium" described in this specification includes all of media that contribute to the provision of instructions for executing a program to a processor. Specifically, the "computer-readable recording medium" includes non-volatile media such as a data storage device, an optical disk and a magnetic disk, volatile media such as dynamic memory, and transmission media such as a coaxial cable, a copper wire and an optical fiber for transmitting data, but is not limited thereto.

The elements to execute the technical characteristics of the present invention, included in the block diagrams and flowcharts shown in the accompanying drawings of this specification, mean a logical boundary between the elements. In accordance with a software or hardware embodiment, however, the illustrated elements and functions thereof are executed in the form of an independent software module, a monolithic software structure, code, a service or a combination of them, and are stored in a medium executable by a computer including a processor capable of executing stored program code and instructions and the functions of the illustrated elements may be implemented. Accordingly, all of such embodiments should be construed as belonging to the range of right of the present invention.

Accordingly, the accompanying drawings and technologies thereof describe the technological characteristics of the present invention, but should not be simply reasoned unless a specific array of software for implementing such technological characteristics is clearly described otherwise. That is, various other embodiments may be present and may be partially modified while having the same technological characteristics as those of the present invention. Accordingly, such modified embodiments should be construed as belonging to the range of right of the present invention.

Furthermore, the flowchart describes operations in the drawing in a specific sequence, but has been illustrated to obtain the most preferred results. It should not be understood that such operations must be executed or all the illustrated operations must be executed in the illustrated specific sequence or sequential order. In a specific case, multitasking and parallel processing may be advantageous. Furthermore, the separation of various system components in the aforementioned embodiments should not be construed as being requested in all of the embodiments. It should be understood that the aforementioned program components and systems may be integrated into a single software product or packaged into a multi-software product.

As described above, this specification is not intended to limit the present invention by the proposed detailed terms. Accordingly, although the present invention has been described in detail in connection with the aforementioned embodiments, a person having ordinary skill in the art to which the present invention pertains may alter, change, and modify the embodiments without departing from the range of right of the present invention. Accordingly, the range of right of the present invention is defined by the appended claims rather than the detailed description, and the present invention should be construed as covering all of modifications or variations derived from the meaning and scope of the appended claims and equivalents thereof.

What is claimed is:

1. A method for an authentication device to authenticate a target device, the method comprising:
   photographing, by the authentication device, at least some region of the target device to generate a photographed image;
   comparing, by the authentication device, a photographed image with a previously stored reference image;
   connecting, by the authentication device, to the target device over a short distance communication network responsive to similarity between the photographed image and the reference is greater than a threshold;
   transmitting, by the authentication device, a verification request to the target device through the short distance communication network;
   recognizing, by the authentication device, a verification response from the target device; and
   transmitting, by the authentication device, a result of the verification to the target device.

2. The method of claim 1, further comprising previously registering, by the authentication device, the target device before photographing the at least some region of the target device.

3. The method of claim 2, wherein previously registering the target device comprises:
   connecting the authentication device and the target device over the short distance communication network;
   photographing, by the authentication device, the at least some region of the target device; and
   storing, by the authentication device, the photographed region of the target device as the reference image.

4. The method of claim 1, further comprising:
   receiving, by the authentication device, location information from the target device before transmitting the verification request to the target device; and
   comparing, by the authentication device, current location of the authentication device with the location information of the target device,
   wherein transmitting the verification request to the target device is performed when a distance value between the location of the authentication device and the location of the target device is smaller than a threshold.

5. The method of claim 1, wherein comparing the photographed image with the previously stored reference image comprises:
   extracting a plurality of feature points from the photographed image; and
   comparing the plurality of extracted feature points with the reference image.

6. The method of claim 1, wherein:
   recognizing the verification response of the target device comprises recognizing, by the authentication device, an output screen of the target device, and transmitting the result of the verification to the target device comprises transmitting, by the authentication device, a value calculated based on the output screen to the target device.

7. The method of claim 6, wherein the output screen of the target device comprises a plurality of randomly combined colors.

8. The method of claim 6, wherein:
   recognizing the output screen of the target device comprises recognizing, by the authentication device, at least some region of the recognized output screen and calculating RGB values based on colors within the recognized region, and
   transmitting the value calculated based on the output screen to the target device comprises transmitting, by the authentication device, the calculated RGB values to the target device.

9. An authentication system, comprising:
   an authentication device configured to generate a photographed image by photographing at least some region of a target device to generate a photographed image, compare the photographed image with a previously stored reference image, connect to the target device over a short distance communication network responsive to similarity between the photographed image and the reference image is greater than a threshold, transmit a verification through the short distance communication network, recognize a verification response from the target device, recognize a verification response from the target device, and transmit a result of the verification response to the target device; and
   the target device configured to perform the verification step along with the authentication device and release locking based on a result of the verification.

10. The authentication system of claim 9, wherein the verification step is performed through a medium of an output screen from the target device in response to the verification request of the authentication device.

11. The authentication system of claim 10, wherein the output screen comprises a plurality of randomly combined colors.

12. The authentication system of claim 10, wherein:
    the authentication device recognizes at least some region of the output screen, calculates RGB values based on colors within the recognized region, and transmits the calculated RGB values to the target device, and
    the target device permits a connection with the authentication device if the RGB values received from the authentication device correspond to a plurality of colors included in the output screen by the target device.

13. The authentication system of claim 9, wherein the authentication device receives location information from the target device and performs the verification step if a distance value between the location of the target device and a location of the authentication device is smaller than a threshold.

14. A non-transitory computer-readable recording medium storing instructions thereon, the instructions when executed by a processor cause the processor to:
    photograph at least some region of a target device to generate a photographed image;
    compare the photographed image with a previously stored reference image;
    connect to the target device over a short distance communication network responsive to similarity between photographed image and the reference image is greater than a threshold;
    transmit a verification request to the target device through the short distance communication network;
    recognize a verification response from the target device; and
    transmit a result of the verification to the target device.

* * * * *